United States Patent
Thomas et al.

[19]

[11] Patent Number: 6,141,546
[45] Date of Patent: Oct. 31, 2000

[54] MOBILE TELEPHONE SYSTEMS

[75] Inventors: Howard John Thomas, Cirencester; Rupinder Singh Oberoi, Wootton Bassett; Christopher Parker, Malmesbury; Philip Jones, Wootton Bassett, all of United Kingdom

[73] Assignee: Motorola, Inc., Schaumburg, Ill.

[21] Appl. No.: 08/953,126

[22] Filed: Oct. 17, 1997

[30] Foreign Application Priority Data

Oct. 18, 1996 [GB] United Kingdom ............... 9621797

[51] Int. Cl.[7] ...................................................... H04B 1/00
[52] U.S. Cl. ........................... 455/424; 455/450; 455/452
[58] Field of Search ................................. 455/67.1, 67.4, 455/67.3, 423, 424, 446, 447, 448, 450, 451, 452

[56] References Cited

FOREIGN PATENT DOCUMENTS

| 0431956A2 | 6/1991 | European Pat. Off. . |
| WO96/23371 | 8/1996 | WIPO . |

*Primary Examiner*—Nguyen Vo
*Assistant Examiner*—Makoto Aoki
*Attorney, Agent, or Firm*—Kenneth A. Haas

[57] ABSTRACT

In a mobile cellular communication system, adjacent basestations BS1–BS4 are assigned different selections of different frequency channels to communicate with mobiles in their cells (10, etc.). To improve system quality and capacity, a basestation selects a frequency channel which is not assigned to it or any neighbour station, and makes test communications on that frequency channel with mobiles (e.g. MS1) in its cell. The basestation assesses the potential performance of that frequency channel, and neighbour basestations can monitor for potential interference on that frequency channel. The information so gathered can be analysed by an operations maintenance station OMC.

8 Claims, 2 Drawing Sheets

MOBILE TELEPHONE SYSTEMS

FIELD OF THE INVENTION

The present invention relates to cellular mobile telephone systems, and more particularly to the monitoring and assignment of frequency channels in such systems.

BACKGROUND OF THE INVENTION

Cellular Mobile Telephone Systems Generally

A cellular mobile telephone system, such as GSM (Global System for Mobile Communication), essentially comprises a set of basestations and a number of mobile stations or units. (Each basestation is a combined transmitter and receiver station, for 2-way communication with the mobile units.) The basestations are at fixed geographical positions, and the mobile units are generally portable units which can move relatively freely though the region covered by the basestations.

The basestations will of course be coupled together. Typically they are termed Base Transmitter Stations (BTSs), which are grouped into groups each of which is supported by a Base Subsystem Controller (BSC). The BTSs and BSCs together for a Base Subsystem Station (BSS), and the BSSs are in turn grouped into groups each of which is supported by a (fixed) Mobile Switching Centre (MSC). There are fixed communication links (e.g. private lines or the public switched telephone network, PSTN) between the BTSs, BSSs, and MSCs, and between the system generally and other communication systems (e.g. the public telephone system), while communication between the BTSs and the mobile systems is of course by radio. We will term the basestations (or just "stations") plus the associated control stations and links the "fixed system"; the complete system consists of the fixed system plus the mobiles (mobile units).

Obviously the system must support communication with many mobile units simultaneously. Broadly speaking, each station can communicate with mobile units within a region (called a cell) around it. The size of the cell is determined by a variety of factors, such as the transmitter power and receiver sensitivity of the basestation, geographical features such as hills or tall buildings, interference from other basestations, and so on. The cells should overlap to some extent, so that there are substantially no places which are not within at least one cell.

A given system has a frequency band assigned to it, and the frequency band is divided into frequency channels. In an analogue system, a station can communicate with several mobile units at a time using a different channel for each mobile unit. In a digital system, each frequency channel is normally divided into several time slots each of which can carry a single call. The frequency channels in a digital system are sometimes simply be termed "frequencies", with the time slots within those frequencies being termed "channels"; here, we will use the term "channel" to mean a frequency in an analogue system and a frequency, possibly plus a time slot, for a digital system.

A mechanism is required for dedicating a channel to an mobile unit when communication with that mobile unit is required. This is achieved by using a particular channel as a control channel. When a mobile unit is in the quiescent or idle state, with no call being made, it monitors the control channel. If a call is made, the mobile unit and the station initially communicate with each other over the control channel. The station dedicates one of the other channels to the call and passes that dedication to the mobile unit over the control channel. The call itself (i.e. the voice or data communication) then proceeds between the station and the mobile unit using the dedicated channel (with the mobile unit in the active state). The amount of communication over the control channel is small, and this channel can therefore be shared between a large number of mobile units without serious difficulty.

Knowledge of Mobile Locations

In any practical system, it is necessary for the location of each mobile unit to be known, at least approximately, by both that mobile unit and the fixed system. The control channel is used to maintain this system knowledge. Each basestation broadcasts identification information on its control channel, and each mobile unit monitors the control channel. (The mobile units do this on a periodic basis, to minimise power consumption in the idle state.)

Each mobile unit monitors the control channel to identify a cell giving control signals of adequate strength. (A mobile may of course be at a location where 2 or more cells overlap; in that situation, it picks one of the possible cells.) If the mobile unit finds that the control signals from another cell are substantially stronger than those from the cell it is in, it changes to that new cell. Each mobile unit therefore knows where it is in the system, i.e. which cell it is in.

A mobile unit can of course be disconnected from the system, e.g. as a result of being switched off or in a location where it is shielded from or outside the geographical range of the fixed system. When such a mobile enters the system, i.e. first detects signals on the control channel and discovers which cell it is in, it sends a signal to the fixed system announcing its presence in that cell. If the mobile unit then moves sufficiently far through the system, it again sends a signal to the fixed system (via the local station) to update the fixed system on its new position. The fixed system therefore knows where the mobile is.

In practice, it may be convenient to group the cells into groups in the fixed system, with a mobile unit informing the fixed system of a change of location only if it moves from one group of cells to another. (This grouping may match the grouping of BTSs into groups by BSC, or of BSSs into groups by MSC.) Thus the mobile unit will know which cell it is in, but the fixed system will only know the location of the mobile unit to within an area of several cells. So when the mobile unit originates a call, it communicates with a particular station, but if the mobile unit is called, the fixed system may have to cause several stations in turn to try to communicate with the mobile unit.

A mobile may of course move from one cell to another while it is in the active state, i.e. while a call is in progress. The system (either the basestation or the mobile) will recognise this by finding that the signal strength or quality between the mobile and the station falls below an acceptable level. The system is normally designed to enable the mobile to select a new cell and to switch its link from the current cell to the new cell by suitable communication over the control channel, while maintaining the call in progress. In this case, the fixed system will of course be aware of the change of cell by the mobile even if that change is within a single cell group.

Frequency Assignments

As noted above, any particular system uses a particular frequency band, and that band is divided into a large number of distinct frequency channels. These frequency channels have to be distributed among the various stations of the system.

It is of course necessary to keep uplink communication from mobile units to stations and downlink communication from stations to mobile units separate. In some types of digital system, this is achieved by using different time slots in a single frequency channel for uplink and downlink communications. In analogue systems and some other types of digital systems, the frequency band is divided into two separate sub-bands for uplink and downlink communications. However, the two sub-bands generally have identical numbers of frequency channels, and the distributions of the frequency channels of the two sub-bands among the basestations are generally identical. Thus we can generally discuss matters in terms of a single frequency band (i.e. a single set of frequency channels) even if that band is in fact divided into separate uplink and downlink sub-bands.

To maximise the number of frequency channels in a frequency band, the frequency channels are usually packed closely enough together for there to be a danger of interference between adjacent frequency channels. It is therefore necessary to distribute the frequency channels among the stations in such a way that no station has two adjacent frequency channels.

As noted above, each station can communicate with mobile units within its cell; that is how a cell is defined. Also, the cells of the stations of the system overlap, so that there are virtually no places which are not within at least one cell. That means that there will be overlaps between cells, and some places will be covered by at least 3 cells. It is clearly important to minimise the possibilities of interference between adjacent cells, and the distribution of frequency channels among the stations should be chosen accordingly.

A reasonable way of doing this is to divide the frequency channels in cyclic sequence into a suitable number of groups; thus with 12 groups, group 0 will have frequency channels 0, 12, 24, &c, group 1 will have frequency channels 1, 13, 25, &c, and so on. The groups can then be assigned to the stations so that no two adjacent cells have the same group.

The simplest and, in a sense, "ideal" pattern of cells would be hexagonal, which would only require 3 groups to avoid conflict between adjacent cells. In practice, however, cell sizes may differ substantially. For example, it is desirable to match the cell size broadly to the expected density of mobile units (e.g. by suitable choice of the transmitter power of the station). So a large cell may be surrounded by more than 6 other cells, and the number of groups therefore has to be substantially larger than 3.

The cell size and shape will also be affected by geographical factors such as hills, restrictions on where the stations can be located, clutter caused by high density of buildings, &c. There may also be small cells required to achieve coverage of shielded regions within large cells. Some of these factors may affect different frequency channels differently, so the cell size may vary slightly for different frequency channels. Further, the system may develop over time, typically with the addition of further basestations to cope with increased traffic.

A single station location may have 2 or more aerial arrays having different coverages. Logically, i.e. functionally, such a location can be regarded as (and will be treated here) as 2 or more distinct stations, one for each array, each with its own distinct cell.

The assignment of the frequency channels to the stations is normally performed by design engineers, using their skill and experience to estimate the sizes of the cells and the achieve a good distribution of groups among the cells. However, the assignment of frequency channels to the stations is often far from ideal. Thus the actual cell sizes will normally differ to some extent from the estimated sizes, and may change as a result of, for example, building development. The cell size for a particular frequency channel around a particular station may in fact differ considerably from the estimated or average size of that cell. Also, the system may well change over time, with changes in the characteristics of the stations and possibly the addition of fresh stations to cope with increasing traffic.

These effects will often result in the actual cells differing from the estimated cells. Thus a cell may extend beyond one part of the estimated boundary but fail to reach another part of the estimated boundary, there may be a shielded area or "hole" in it, and there may be an isolated area beyond its main boundary resulting from signal splash or skip.

The effect of this is to reduce the capacity and quality of service of the system. In addition, of course, the procedure of dividing the frequency channels into groups which are then assigned to different stations is a conservative technique designed to minimise the possibilities of interference, and it may well be that a particular frequency channel (or several frequency channels) could in fact be assigned to more stations.

It is therefore desirable to have some method of monitoring or measuring the performance, actual and potential, of the system, in terms of cell size, frequency channel distribution among basestations, interference between frequency channels, &c.

Current Technique

System performance can be measured by means of a test mobile which is transported through the regions of interest. A test mobile is a type of mobile unit specialised for testing purposes, and is generally operated by a skilled engineer. It can, for example, be driven along particular roads or around the boundaries of particular regions. As it travels, it can attempt to communicate with various nearby stations over various frequency channels. Detailed information can thus be gathered of how the transmission characteristics for different stations and different frequency channels vary within the region being traversed. This can then be used to adjust various characteristics of the system (e.g. the distribution of the frequency channels among the various stations) to improve system performance.

This technique has certain drawbacks. The test mobile, being specialised for testing purposes, is relatively expensive. More significantly, the process is normally carried out by trained engineers, involving a high degree of skill, time, and labour, and is therefore very expensive.

The general object of the invention is to provide an improved method of monitoring or measuring the performance of a mobile telephone system.

SUMMARY OF THE INVENTION

As described above, the frequency channels available to the system are distributed among the stations in such a way that the cells for a particular frequency channel are isolated from each other—separate "islands", so to speak. These islands are surrounded by a "sea" in which communication will take place on other frequency channels. (It is possible that two such islands may occasionally overlap; in that case, if a mobile in the region of overlap gets that frequency channel dedicated to it, the system will discover that the quality of the link to the mobile is unacceptable and will change the frequency channel.)

The crux of the invention lies in a selecting, for a station, a frequency channel which is not assigned to that station or any neighbour station (i.e. is disjoint from those frequency channels), and sending messages on that frequency channel to mobiles in or near its cell, so as to assess the potential coverage and interference from that cell into neighbouring cells. (Stations are neighbours if their cells overlap and a mobile moving between those two cells can be handed over direct between the two stations.) The frequency channel selected may be termed a test channel (i.e. the frequency channel selected), and the messages sent on it test messages. The mobiles used in this process will normally be ordinary customer mobiles, though of course special test mobiles can be used as well if desired.

Since the test frequency is disjoint from those of the station concerned and all its neighbours, there should be very little noise on the test channel, so a good assessment of the coverage of the cell should therefore be obtained. Once the assessment has been made, decisions can then be made on the assignment of further frequency channels to the cell (and, of course, to other cells on the basis of similar assessments for those cells).

There are various options for performing the present procedure, depending on whether the system is an analogue or digital system and whether the mobile is idle or active.

With an idle mobile, the mobile will be monitoring the control channel for messages from the basestation. To carry out the test, the station will send out a message to the mobile on the control channel, identifying the test channel and asking the mobile to monitor for a message on that frequency channel. The mobile will duly monitor for that message, record the signal strength and quality, and report that information back to the basestation.

The reporting back of this information from the mobile to the basestation can be done either via the control channel or via the test channel. In general, it is probably preferable to use the test channel, for two reasons. First, the basestation can monitor the signal strength and quality, so that the quality of communication on the test channel can be determined in both the uplink and downlink directions. Second, neighbour basestations can also monitor the test channel for signal strength, so that the possibility of interference with such neighbour basestations from mobiles using the test channel can be assessed. (This will also give an indication of the interference that would occur from a neighbour cell into mobiles in the current cell.)

The basestation can ask the mobile to include, within its report, whether it is also within any neighbour cells. This will allow the potential communication characteristics of the test channel to be assessed for particular border areas of the cell.

The fixed system may be aware of the location of the mobile only to within an area served by a group of basestations; in this case, the basestation carrying out the test will first have to discover whether the mobile is within its cell.

The use of a mobile in the idle state in this way may require a significant adjustment to its operation, since it involves setting it into what is effectively an active state.

The process can instead use active mobiles. The use of active mobiles has the advantage that an active mobile is by definition within the cell of the basestation making the test. Further, little or no modification of the operation of the mobiles is likely to be required.

In this case, the location of the mobile is already known, and communication between the basestation and the mobile is already in existence. It is of course desirable to avoid undue interference with that communication. This can be achieved by the basestation switching the communication from the current frequency channel to the test channel, and switching it back again after a sufficient time for the communication characteristics of the test channel to be assessed. (If the test channel turns out to be inadequate to support an acceptable level of communication, the system will switch to some other frequency channel or some other basestation in the normal way.)

In a digital system, each frequency channel can carry a large number of signals in respective time slots, and one of the time slots will normally be used for permanent synchronising signals (along with other control-type signals). In such a system, a mobile typically monitors many frequency channels for signal quality (although it can communicate on only a single frequency channel at a time—the frequency channel designated for it). If the mobile is idle, it merely maintains an internal frequency channel quality list of say the 6 strongest frequency channels; when it becomes active, the contents of this list are used to pick a suitable frequency channel for the subsequent communication. (This is in contrast with an analogue system, where each frequency channel carries a single system, so that if there is a signal present on a frequency channel, that channel is in use.) Once it is active, it regularly updates the basestation with its frequency channel quality list.

In such a system, the basestation can simply transmit on the test channel and request the mobile to report back its frequency channel quality list. The test signal can in this case consist merely of generating the permanent synchronising signals for that frequency channel in the appropriate time slot. If the test channel appears in the list reported back from the mobile, the basestation will know what the downlink quality of that frequency channel is; if it does not appear in the list, the basestation will know that the downlink quality of the test channel is worse than that of the last frequency channel which is in the list.

If the mobiles monitor all possible frequency channels, then this will result in the basestation gathering information about the test channel from all active mobiles in its cell. However, the mobiles may be able to monitor only a limited number of frequency channels, as defined by a frequency channel list held inside each mobile. In this case, the basestation must choose which mobiles it will use for testing the test channel, and instruct those mobiles to include the test channel in their lists of frequency channels to be monitored. (The basestation can restore the frequency channel lists after the test by instructing the mobiles to delete the test channel from their frequency channel lists.)

As just noted, an active mobile regularly updates the basestation with its frequency channel quality list. If the mobile moves to a location where two or more cells overlap, that list will start to include frequency channels from neighbour stations. The basestation can therefore identify mobiles in particular border regions of the cell, and by choosing such mobiles, it can thus assess the signal characteristics of the test channel for those regions. (The basestation can, for example, perform the test as mobiles enter or leave its cell, so gathering information for both boundaries of the overlap region with the neighbour cell.)

As discussed above, it may be desirable for the basestation to switch communication from the current frequency channel to the test channel, so that the uplink characteristics of the test channel can be assessed. In the case of a digital mobile which is active, this can be done selectively in dependence on the location of the mobile, so that the potential interference of the uplink with particular neighbour cells can be assessed.

By accumulating test results over many mobiles and over time, the system can determine the general communication quality and coverage for the cell.

The basestation's power may be increased to above normal level for the test messages, so that if the test channel is likely to cause interference, the chance of detecting such interference is increased. Similarly, it may be possible to force the mobile to transmit messages on the test channel at higher than normal power.

The cell size, the load or demand from mobiles within the cell, and the locations of mobiles within the cell may all change periodically, e.g. at different times during the day. Information may be gathered by the present technique at particular calendar times and used to develop cyclic patterns of frequency assignments.

Concentric Cells

The present invention, in addition to being applicable to cellular systems generally as discussed above, also finds special applicability to concentric cell systems.

In cellular systems generally, as discussed above, the cells are geographically separated, though of course overlapping at the edges. But it is possible for a small cell to be wholly contained within a large cell, either to fill in a shielded region or to provide additional capacity for that small region, as mentioned above. A concentric cell system is a further extension of this principle.

If the demand on an ordinary cellular system approaches or exceeds its capacity, the standard solution is to add further cells between the existing cells. But if a substantial part of the demand arises within the close proximity of a basestation, a concentric cell may be used instead. For this, an existing basestation is upgraded by having assigned to it additional frequency channels which are already assigned to neighbour basestations.

This is of course liable to result in interference between the basestation and the neighbour basestations. However, by suitable choice of the frequency channels, and possibly by restricting the power used for those frequency channels by the basestation being upgraded, the effect on the neighbour basestations can be kept small. But the area covered by the new frequency channel from the basestation being upgraded will of course be relatively small, because of the effects of interference from the neighbour basestations and possible power restrictions.

The new frequency channels will therefore cover a relatively small area within the main cell of the basestation and of course centred on the basestation. This area can therefore be regarded as a separate cell concentric with the main cell, and the basestation may be regarded as two logically (functionally) distinct basestations, one using the original set of frequency channels and the other using the new frequency channels.

The concentric cell will therefore generally be considerably smaller than the corresponding normal cell. If a mobile in the normal cell is within or enters the small concentric cell, the call will normally be set up with or taken over by the concentric basestation from the main basestation. The demand in the main basestation's cell is thus divided or shared between the main basestation and the concentric basestation.

Although the power of the concentric cell can be kept low to minimise its interference effects on neighbour cells, some interference is nevertheless likely, and restricted power will also limit the size of the concentric cell. It may therefore be preferable to make the neighbour cell a concentric cell as well for the frequency channel concerned, so that the two concentric cells sharing the same frequency channel are separated by a substantial distance. Applying this principle generally will result in the frequency channels of the system being broadly divided into 2 classes, those in one class being used for normal cells and those in the other class for concentric cells. A frequency channel used for normal cells can only be used for a relatively small proportion of such cells, as it must not be used for neighbouring cells; a frequency channel used for concentric cells can be used in a much larger proportion of such cells.

The present invention can of course be used to assess the likely coverage of the normal cells in such a system. For assessing the coverage of such normal cells, the procedures discussed above will be used.

In addition, it can be used to assess the likely coverage of concentric cells in such a system, and to assess the likely coverage which concentric cells will have if an existing system using standard cells is modified to introduce concentric cells. For concentric cells, the procedure has to be slightly more elaborate, because determining the size of a concentric cell is most simply regarded as a 2-stage process. The size of the corresponding normal cell is first determined. But communication with mobiles in much of the outer regions of this normal cell is not possible using the concentric basestation, because those regions are subject to interference from neighbour cells. So those outer regions have to be removed from the normal cell to obtain the concentric cell.

To assess the likely coverage of a concentric cell, therefore, the coverage of the corresponding normal cell must first be obtained. Then, for a mobile within the normal cell, test signals on the test channel are sent to that mobile from each neighbour basestation in turn, and the concentric cell's basestation and the neighbour basestation both monitor the mobile's response. If the mobile has detected the neighbour basestation's test signal, it is within the neighbour basestation's normal cell, and therefore outside the concentric cell of the basestation whose concentric cell is being assessed.

As with normal cells, the assessment of concentric cells does not determine their geographical extent. But it does allow their size to be determined, where size is measured as the average number of mobiles in the cell.

BRIEF DESCRIPTION OF THE DRAWINGS

A mobile telephone system embodying the invention will now be described, by way of example, with reference to the drawings, in which.

DESCRIPTION OF A PREFERRED EMBODIMENT

Figure 1:
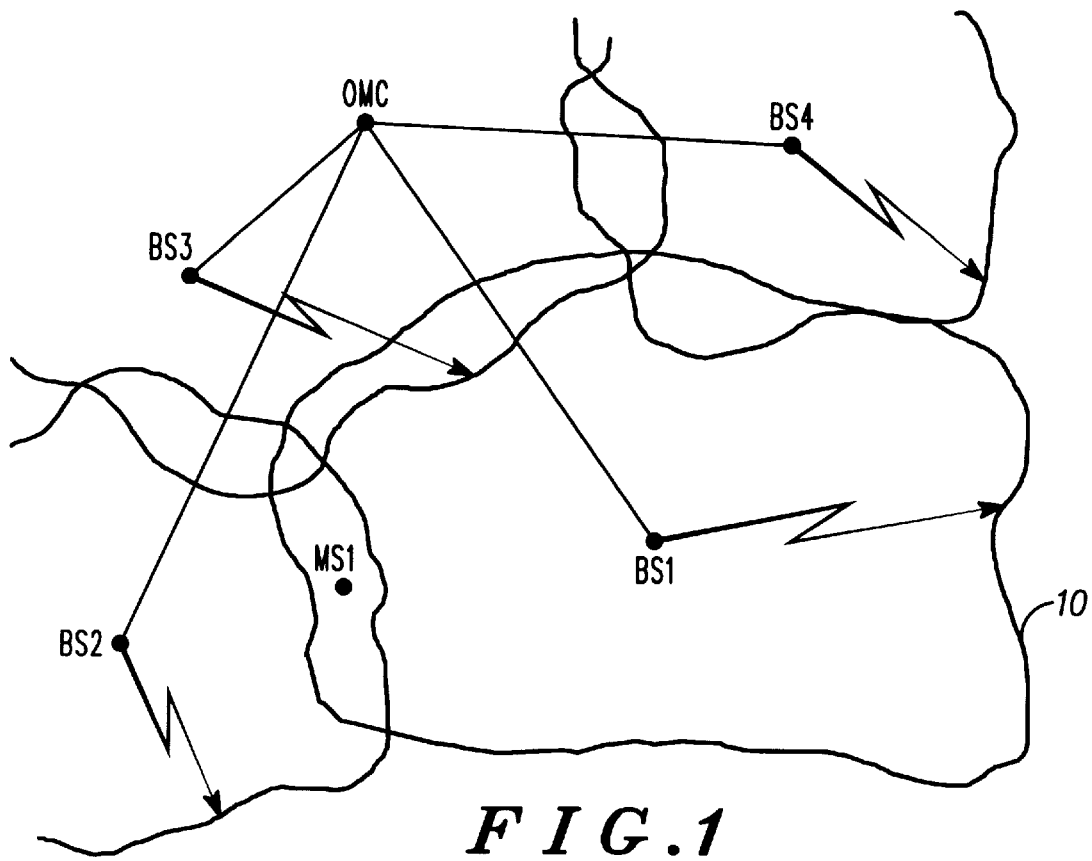
FIG. 1 shows a portion of a cellular mobile communication system.

FIG. 1 shows a portion of a cellular mobile communication system. Four basestations BS1 to BS4 are shown, together with their cells. Thus the boundary of the cell of station BS1 is shown at 10, and indicated also by the jagged arrow from BS1 to that boundary. These cells generally overlap at their edges, as shown, so that there are few or no points which are not within at least one cell. A single mobile station MS1 is shown, at a position within the cells of stations BS1 and BS2. The basestations are all connected over fixed links to an operations maintenance centre (OMC) which controls the system in general and the basestations in particular.

As discussed above, the exact extent of the cells is somewhat fuzzy; higher power may be required to communicate effectively near a cell boundary, the exact position of the boundary may be different for different frequency channels, and so on.

Figure 2:
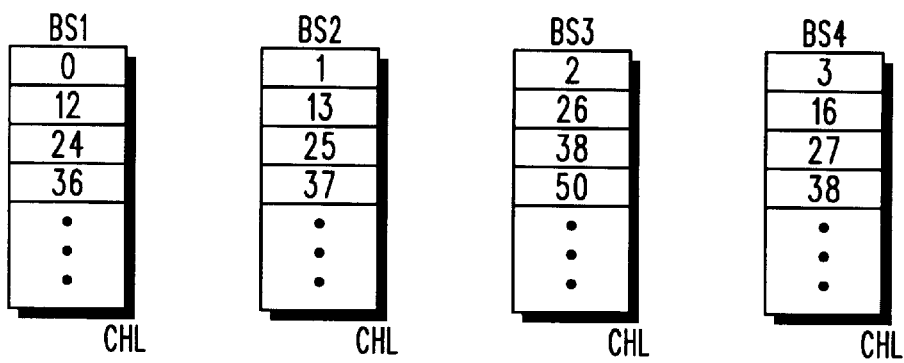
FIG. 2 shows a set of frequency channel lists for various units in the FIG. 1 system.
Figure 2:
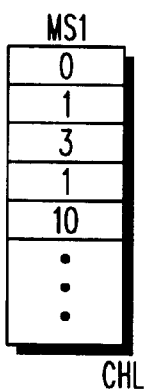

Each basestation includes a memory containing a list of the frequency channels assigned to that station. FIG. 2 shows these lists CHL for the various units of the system. As shown, the frequency channels have been assigned on the basis of the division described above, but minor deviations from that basic division have been made over time; thus the list for station BS3 does not include frequency channel 14, and the list for station BS4 includes frequency channel 16 instead of frequency channel 15.

Each mobile also contains a somewhat similar list CHL, which lists the frequency channels which that mobile is to monitor (and which can be designated for communication with that mobile). The list for mobile MS1 is shown.

Figure 3:
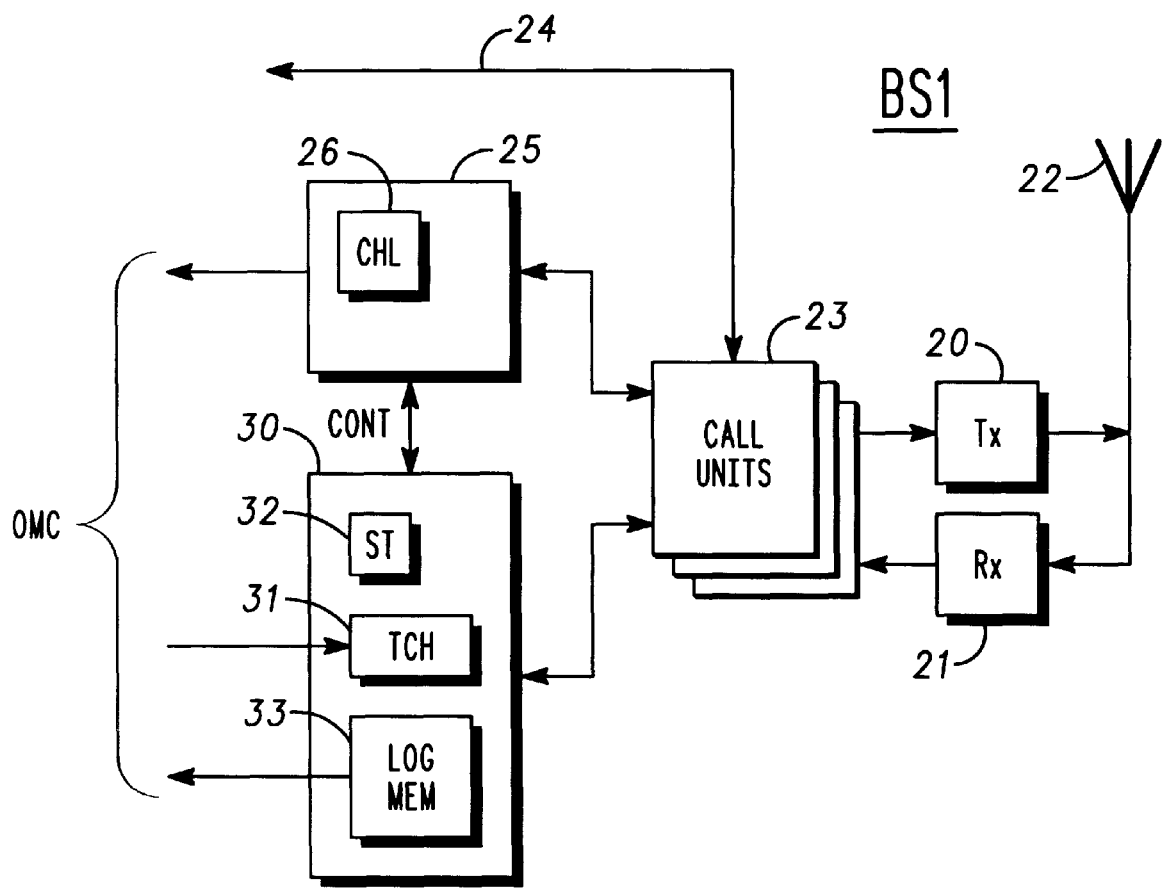
FIG. 3 shows a simplified logical arrangement of a basestation.

FIG. 3 shows a simplified logical arrangement of a basestation. A transmitter unit 20 and a receiver unit 21 are coupled to an aerial 22. There is a plurality of call control units 23, coupled to the transmitter and receiver units and to a fixed communication link 24. Each call which passes through the station is assigned to a different call unit 23. (Obviously, although these call units are logically separate, many of their functions may be multiplexed among the physical apparatus.)

There is also a control unit 25, coupled to the call units 24, which includes the station's frequency channel list CHL 26. The functions of this control unit include choosing, each time a call is initiated, a frequency channel for that call (and, in a digital system a slot in that frequency channel). It also performs similar functions when the quality of a call becomes unacceptable and a change of frequency channel is required.

The station also includes a test channel unit 30. This includes a test channel register 31, which is used to store a test channel identifier. The frequency channel lists CHL from the frequency channel list memories 26 of all the basestations are passed to the OMC. The OMC is also aware of the geographical locations of the stations, and in particular of which are neighbours of which. The OMC selects a frequency for the test channel for station BS1 which is disjoint from the frequency channels used by that station and all its neighbours. The test channel is shown here as being frequency channel 10.

This test channel is passed to the test channel register 31 in basestation BS1. For this basestation to test the test channel, a status unit 32 in the test channel unit is set to the active state. At suitable intervals, the test channel unit 30 will then monitor the call units 23 to look for a mobile in the active state and in a region where the communication effectiveness of the test channel is of interest. Thus the region of overlap of the cells of BS1 and BS2 may be of interest. The test channel unit may therefore search for an active cell in that region, say mobile MS1 (which we assume to be active). The test channel unit will then cause the call unit 23 handling that call to switch from its current designated frequency channel to the test channel. As discussed above, this may require the basestation to instruct the mobile MS1 to insert the test channel into its frequency channel list CHL (as shown in FIG. 2).

The mobile will pass the contents of its frequency channel quality list to the call control unit 23. That unit will also monitor the quality of the uplink signal from the mobile to the station. The test channel unit will extract the appropriate components of this information from the call control unit and record it in a log memory 33.

Once the call quality on the test channel has been measured, the call unit handling that call can be released to continue the call in the normal way (and revert to one of the frequency channels assigned to the station in its station list CHL if desired).

At the same time that the OMC passes the test channel to station BS1, it passes it to suitable neighbour stations such as station BS2 and sets their status units to the monitor state. In that state, the test channel unit of station BS2 causes its receiver unit to monitor the test channel, and that test channel unit records the results of that monitoring in its log memory.

Thus one station, BS1, is active in testing the test channel, and certain neighbour stations such as BS2 are in the monitoring state. At a suitable time, the contents of the log memories 33 of the active and monitoring basestations are passed to the OMC for analysis.

From this information, the OMC may for example determine the average of all measurements on the test channel from basestation BS2, weighted by received power, to obtain a coupling coefficient between the cells of stations BS1 and BS2. Coupling coefficients between other cell pairs may similarly be obtained, resulting in a matrix of coupling coefficients. From this, a measure of the interference in the system can be calculated by forming the product of this matrix with a vector representing the frequency plan which specifies which cells are using the same or adjacent frequency channels. From this, the frequency allocations can be optimized by minimizing the product.

What is claimed is:

1. In a mobile telephone system comprising a plurality of basestations each of which has a respective plurality of frequency channels assigned to it, the assignments being such as to minimize or obviate the sharing of potentially interfering frequency channels between neighbour basestations, a method of testing the utility of potential frequency channels for a basestation, wherein a test channel is selected with a frequency which is disjoint with the frequency channels assigned to that basestation and neighbour basestations, and that basestation sends test messages on the test channel to mobiles in or near its cell and records for analysis the results returned from the mobiles;

wherein the test messages are sent to active mobiles;

wherein the frequency channels are divided into time slots and mobiles monitor a plurality of frequency channels and send to the basestation a frequency channel quality list of the strongest frequency channels, the basestation determining whether the test channel is included within the list received form the mobile;

wherein the frequency channels monitored by a mobile are determined by a frequency channel list held within the mobile, where the basestation commands the test channel to be temporarily included in that list;

wherein the basestation selects mobiles in dependence on the inclusion within their frequency channel quality lists of frequency channels assigned to particular neighbour basestaitons.

2. A method according to claim 1 wherein neighbour basestations monitor for messages from the mobiles on the test channel and record any results received therefrom for analysis.

3. A method according to claim 1 wherein the test messages are sent to idle mobiles.

4. A method according to claim 3 wherein the mobile responds on the test channel.

5. A method according to claim 3 wherein the mobile responds on the control channel.

6. A method according to claim 3 wherein the mobile response includes information as to whether it is within any neighbour cells.

7. A method according to claim 1 wherein the basestation's power is increased to above normal level for the test messages.

8. A method according to claim 1 wherein the recorded results are analysed in dependence on calendar time.

* * * * *